United States Patent
Evans

(10) Patent No.: US 6,814,379 B2
(45) Date of Patent: Nov. 9, 2004

(54) BUMPER WITH ENERGY ABSORBER FORMING USEFUL FEATURES

(75) Inventor: Darin Evans, Wixom, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/726,169

(22) Filed: Dec. 2, 2003

(65) Prior Publication Data

US 2004/0108737 A1 Jun. 10, 2004

Related U.S. Application Data

(62) Division of application No. 10/294,124, filed on Nov. 14, 2002, now Pat. No. 6,709,036.

(51) Int. Cl.⁷ ............................................. B60R 19/48
(52) U.S. Cl. ..................... 293/117; 280/504; 280/505; 280/491.5; 224/521
(58) Field of Search ................................. 293/117, 120, 293/116, 121, 122, 155, 102; 224/519; 280/511, 491.5, 504, 505

(56) References Cited

U.S. PATENT DOCUMENTS

| | | | |
|---|---|---|---|
| 4,073,508 A | | 2/1978 | George et al. |
| 4,157,189 A | * | 6/1979 | Poley ....................... 280/490.1 |
| 4,165,113 A | | 8/1979 | Casse |
| 4,204,701 A | * | 5/1980 | Oltrogge ....................... 293/117 |
| 4,208,064 A | * | 6/1980 | Wilson ........................ 280/502 |
| 4,221,413 A | | 9/1980 | Bonnetain |
| 4,320,913 A | | 3/1982 | Kuroda |
| 4,379,569 A | * | 4/1983 | Koch ......................... 280/504 |
| 4,398,743 A | * | 8/1983 | Belsky et al. ................ 280/502 |
| 4,426,097 A | | 1/1984 | Livingston |
| 4,441,731 A | | 4/1984 | Belsky et al. |
| 4,607,858 A | * | 8/1986 | Wagner ..................... 280/491.5 |
| 4,610,458 A | | 9/1986 | Garnham |
| 4,807,899 A | * | 2/1989 | Belcher ....................... 280/477 |
| 4,856,833 A | | 8/1989 | Beekman |
| 4,940,270 A | | 7/1990 | Yamazaki et al. |
| 4,978,562 A | | 12/1990 | Wycech |
| 5,005,887 A | | 4/1991 | Kelman |
| 5,092,512 A | | 3/1992 | Sturrus et al. |
| 5,124,186 A | | 6/1992 | Wycech |
| 5,219,197 A | | 6/1993 | Rich et al. |
| 5,358,269 A | * | 10/1994 | Jakeman et al. ............ 280/505 |

(List continued on next page.)

Primary Examiner—Kiran Patel
(74) Attorney, Agent, or Firm—Price, Heneveld, Cooper, DeWitt & Litton

(57) ABSTRACT

A bumper system comprises a tubular roll-formed reinforcement beam. A hitch-supporting bracket has an inverted section shaped to fit downwardly onto the beam, and further has a laterally-extending second section. A hitch support tube is secured to the laterally-extending second section and has a hole for receiving a ball hitch for hauling a trailer. An energy absorber is attached to the beam, and includes a rear recess receiving the beam, a center section providing access to the hitch, and end sections that form steps on corners of the vehicle.

22 Claims, 4 Drawing Sheets

U.S. PATENT DOCUMENTS

| | | | |
|---|---|---|---|
| 5,372,287 A | | 12/1994 | Deguevara |
| 5,402,179 A | * | 3/1995 | Okada .................. 348/607 |
| 5,425,561 A | | 6/1995 | Morgan |
| 5,507,515 A | * | 4/1996 | Schellenberg et al. ... 280/491.5 |
| 5,511,813 A | * | 4/1996 | Kravitz .................. 280/504 |
| 5,545,022 A | | 8/1996 | Rosasco |
| 5,545,361 A | | 8/1996 | Rosasco |
| 5,620,218 A | | 4/1997 | Saltzman et al. |
| 5,630,606 A | * | 5/1997 | Ryan .................... 280/479 |
| 5,702,118 A | * | 12/1997 | Hanson et al. .......... 280/491.5 |
| 5,836,494 A | * | 11/1998 | Grunsted et al. ........ 224/521 |
| 5,850,959 A | | 12/1998 | Miller |
| 6,085,954 A | | 7/2000 | Bloemer et al. |
| 6,139,044 A | | 10/2000 | Smith et al. |
| 6,165,588 A | | 12/2000 | Wycech |
| 6,189,910 B1 | * | 2/2001 | Bartel .................. 280/491.2 |
| 6,217,089 B1 | | 4/2001 | Goto et al. |
| 6,234,510 B1 | | 5/2001 | Hammons |
| 6,244,483 B1 | * | 6/2001 | McLemore et al. ......... 224/521 |
| 6,250,664 B1 | * | 6/2001 | Tetrick ................. 280/504 |
| 6,443,345 B1 | * | 9/2002 | Bloemer et al. .......... 224/519 |
| 6,414,522 B1 | | 11/2002 | Johnson |
| 6,511,086 B2 | * | 1/2003 | Schlicht ................ 280/166 |
| 6,709,036 B1 | * | 3/2004 | Evans ................... 293/117 |
| 2001/0017473 A1 | | 8/2001 | Yamamoto |
| 2002/0053782 A1 | * | 5/2002 | Peters .................. 280/504 |
| 2002/0175196 A1 | * | 11/2002 | Johnson ................. 224/514 |

* cited by examiner

BUMPER WITH ENERGY ABSORBER FORMING USEFUL FEATURES

CROSS REFERENCE TO RELATED APPLICATION

This application is a divisional of application Ser. No. 10/294,124, filed Nov. 14, 2002, now U.S. Pat. No. 6,709,036 entitled BUMPER WITH HITCH.

BACKGROUND OF THE PRESENT INVENTION

The present invention relates to bumpers having a hitch adapted to haul a trailer or the like, and also to bumpers having energy absorbers adapted to mount accessories and form steps.

Rear bumpers of vehicles, especially utility vehicles and trucks, are often adapted with hitches to haul trailers. The hitch-supporting structure is often incorporated into the bumper in order to reduce components and to provide a more compact arrangement. With stamped bumpers, the hitch-supporting structure is simply stamped into the bumper beam as the bumper components are formed and auxiliary reinforcements are added. However, it is more problematic with rollformed tubular bumper beams, since rollforming operations are not typically set up to incorporate stamping operations. Further, tubular beams often use higher-strength materials, such that it is not as easy to form a hitch-supporting structure in a tubular beam. Also, hitch-supporting structures require that the side walls of the material be cut and shaped, at a time when it is difficult to support an inside of the tube. This makes it difficult if not impossible to accurately shape the wall as desired.

Sometimes, the towing strength of the hitch-supporting structure is more limited than desired. In particular, class II hitches must be able to support a tongue weight of 350 lbs., and must be able to tow a weight of 3500 lbs.; while class III hitches must be able to support a tongue weight of 500 lbs., and must be able to tow a weight of 5,000 lbs. The difference between the two hitch classes is considerable, and the structure necessary to pass the tougher class III standard is not easily achieved without significant cost, weight, and vehicle-built-in structure.

In addition to the above, it is desirable to reduce the number of components required to mount accessories such as tail lights, turn signal lights, license plate illuminating lights, and the like, onto bumper systems. Further, it is desirable to form features integrally into the bumper system, such as steps and other mounting features, without the need for separate bracketry and extra parts attached to the beam. However, it is difficult to form features integrally into a roll-formed beam during a rollforming process, since the process of rollforming produces a continuous cross section, while mounting features require some discontinuity, such as holes, hooks, and/or secondary mechanical deforming operations. Historically, energy absorbers made of plastic are not suitable for mounting, since the plastic is chosen to optimize energy absorption with a consistent energy-absorbing collapse (as opposed to bearing weight). Only recently have plastic materials been developed that are suitable to do both. Another problem is related to gross vehicle weight. Typically, bumper reinforcement beams are extended past the vehicle frame mounts to form bumper steps, with the beam providing the structure necessary to support the weight of a person stepping on the bumper ends. However, this results in considerable additional weight added to the bumper system, since reinforcement beams are metal and tend to be heavy. Thus, any distance that the beam extends laterally beyond the vehicle frame mounts adds undesirably to gross vehicle weight.

Accordingly, a bumper system is desired solving the aforementioned problems and having the aforementioned advantages.

SUMMARY OF THE PRESENT INVENTION

In one aspect of the present invention, a bumper system comprises a tubular bumper beam. A hitch-supporting bracket has an inverted section shaped to fit downwardly onto the tubular bumper beam, and further has a laterally-extending second section. A hitch support tube is secured to the laterally-extending second section and having a hole therein, the second section being shaped to support a ball hitch for hauling a trailer.

In another aspect, a bumper system includes a tubular bumper beam that includes a center section, end sections, and bent interconnecting sections that interconnect each end section with an end of the center section, the center section being at least 25% of a length of the bumper beam and defining a longitudinal primary centerline, and the end sections being at least 15% of the length and each defining a secondary centerline that extends parallel the primary centerline. An energy absorber includes at least one rear recess shaped to receive a portion of the tubular bumper beam, and mounts adapted for attachment to a vehicle are attached to the end sections, the secondary centerline being spaced horizontally from the primary centerline when in a vehicle-mounted position.

In another aspect, a bumper system includes a beam having a face and having mounts adapted for mounting to a vehicle frame, and an energy absorber engaging the face and having end sections located outboard of ends of the beam. The energy absorber is made of a structural engineering polymeric material and the end sections have flat top surfaces for forming steps outboard of the ends of the beam.

In yet another aspect, a bumper system includes a beam having a face and having mounting structures adapted for mounting to a vehicle frame, and an energy absorber engaging the face and made of a structural engineering polymeric material. The energy absorber includes a honeycomb structure for absorbing energy upon a vehicle impact, and further includes accessory-mounting structures for mounting and supporting accessories on the energy absorber.

In still another aspect, a bumper system includes an elongated reinforcement beam having a face and having opposing end sections adapted for attachment to mounts on a vehicle frame to support the bumper system. An energy absorber is provided made of a structural engineering polymeric material for absorbing impact forces against the beam during a collision. The energy absorber includes corner-forming sections extending outwardly from the end sections of the beam in cantilever, the corner-forming sections including top surfaces forming steps at opposite corners of the vehicle for supporting a person while being stepped upon by the person.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
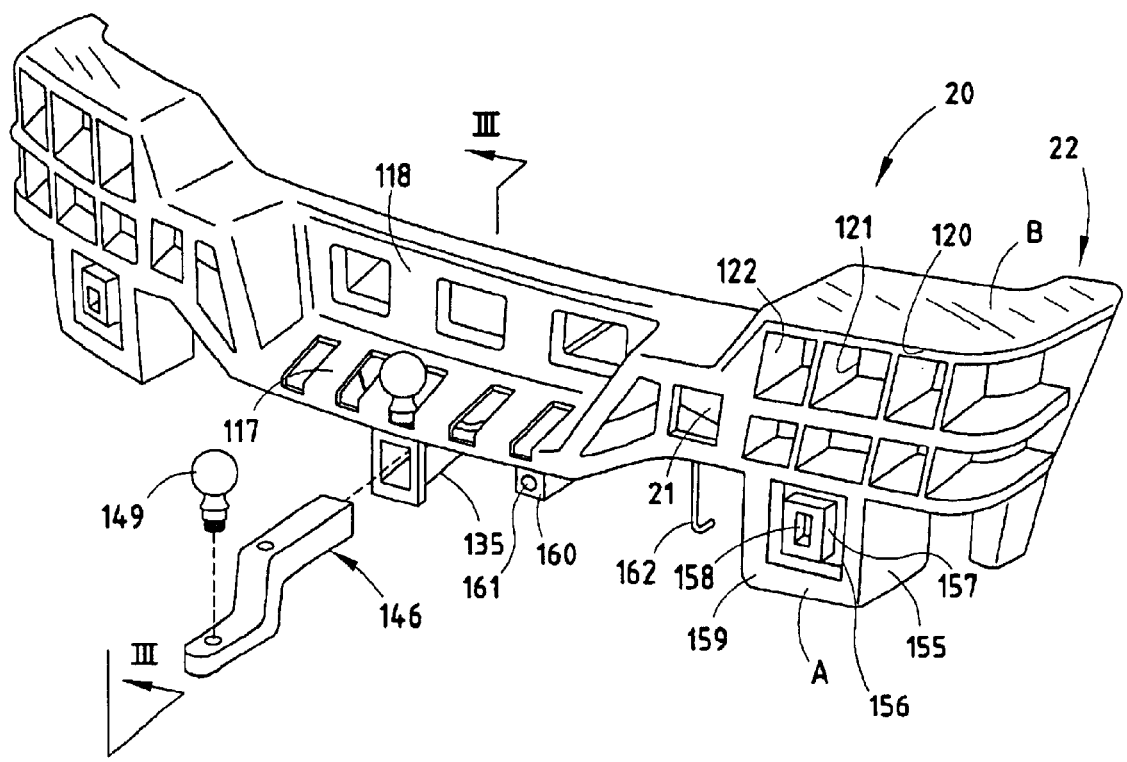
FIG. 1 is a perspective view of a rear bumper system embodying the present invention.
Figure 2:
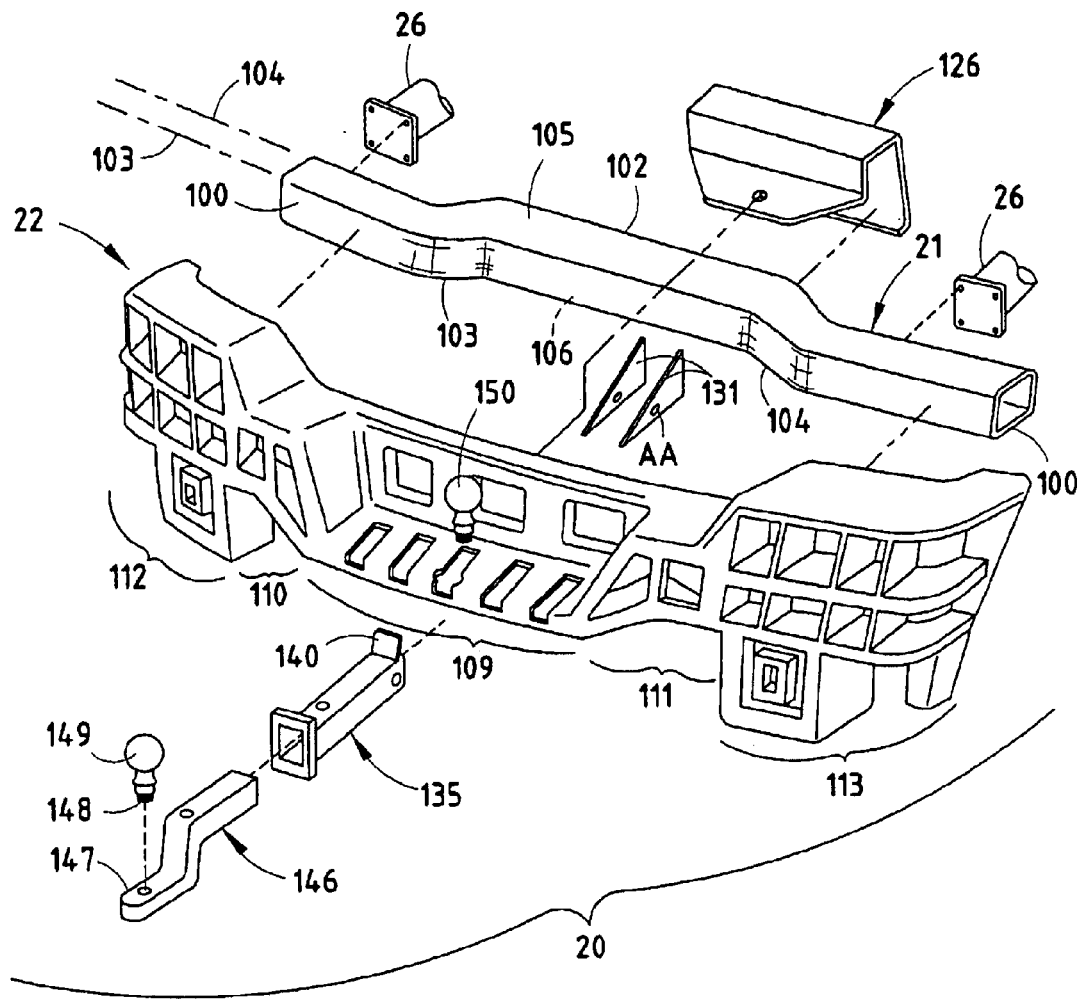
FIG. 2 is an exploded perspective view of FIG. 1.

The bumper system 20 (FIGS. 1–2) is designed for use as a rear bumper for a vehicle, such as for a sport utility vehicle or truck. The bumper system 20 includes a beam 21 and an energy absorber 22 with a recess in its vehicle-facing surface for receiving the beam 21. A TPO plastic fascia (not specifically shown) covers the beam 21 and energy absorber 22 for aesthetics. The beam 21 may be rollformed or stamped and welded into a tubular shape, and/or hydroformed. It can have a rectangular, circular, or other cross section, but it is contemplated that the beam will be tubular for optimal torsional strength-to-weight ratio. The illustrated beam 21 is bent to include aligned opposing end sections 100 and 101, an offset middle section 102, and transition sections 103 and 104 that connect the end sections 100 and 101 to the middle section 102. The end sections 100 and 101 of the beam 21 are aligned and define a first centerline 103, and the middle section 102 defines a second centerline 104 that is spaced horizontally from the first centerline 103. In the illustrated beam 21, the first centerline 103 is spaced toward the vehicle on which the beam 20 is mounted. However, it is specifically contemplated that the first centerline 103 can be spaced rearwardly away from the vehicle instead, if that would be preferred. Preferably, the bends in transition sections 103 and 104 are made such that a full length of the top and bottom walls 105 and 106 is maintained in parallel horizontal planes, such that they provide good strength in a horizontal direction parallel an impact force during a vehicle crash. Advantageously, the offset position of the middle section 102 provides for a step and/or for a towing hitch and ball, as discussed below. At the same time, the shape of the beam 21 maintains a strong "foundation" for the bumper system 20. Specifically, the mounts 26 are welded to or fastened to the end sections 100 and 101, and the offset middle section 102 is located in the same horizontal plane as the mounts 26 but offset toward (or away from) the vehicle. Preferably, the end sections 100 and 101 are each about 15% to 20% of the beam length, and the center middle section 102 is about 25% to 30% of the beam length. These lengths provide an optimal mounting area on the end sections 100 and 101 and allow end sections 100 and 101 to be accurately positioned in an aligned condition, while also providing sufficient space on the hitch-side of the middle section 101 and also for providing accurate dimensional location of the middle section 102. Nonetheless, the dimensions may vary depending on functional and design requirements of the bumper system.

The energy absorber 22 includes an L-shaped middle section 109 defining a step, opposing transition sections 110 and 111 forming sides of the step, and corner sections 112 and 113 extending in cantilever outboard of the beam's end sections 100 and 101 that form corners of the vehicle. A fascia fits over the energy absorber 22 and is supported by the energy absorber 22. A recess 115 is formed on a vehicle-side of the energy absorber 22 for mateably receiving the beam 20, and includes a recess portion on a back side of the middle section 109 for receiving the middle section 102 of the beam 21 along with bracket 126 (see FIG. 3). The energy absorber 22 further includes a recess portion on a backside of the transition and corner sections 110–113 for receiving respective transition and end sections of the beam 21. This creates a support structure for transferring loads to the beam 21, both for step support and for energy absorption from impacts. Notably, it creates a corner step structure with a flat top surface located outboard of and beyond a length of the beam 21. (See area B, FIG. 1.) This arrangement provides good corner impact strength and also provides a step located at an outer corner of the vehicle. The arrangement further provides reduced cost of low speed rear impacts, by providing a structure that is durable and less prone to dings, scratches, and corrosion than traditional stamped rear step bumpers.

More specifically, the L-shaped middle section 109 (FIGS. 3–4) includes a horizontal leg 117 and an upright leg 118. Apertures are formed in the legs 117 and 118 to reduce weight and to improve moldability. The corner section 112 and 113 are mirror images of each other, such that only corner section 112 need be described for an understanding by persons skilled in this art. The corner section 112 is not unlike the corner sections described above in regard to energy absorber 22. The corner section 112 includes an outer "front" wall 120, an interior "rear" wall 121, and stiffening walls 122 that extend between the walls 120 and 121 to form a honeycomb-like structure optimally suited for energy absorption and stress distribution during a vehicle crash. The particular arrangement of the walls 120–122 can vary depending on functional and design requirements. For example, the walls 120–122 can be varied to provide mounting locations for accessories such as taillights, turn signal lights, license plate illuminating lights, and the like. This arrangement provides step support in area B (which is outboard of an end of the metal tubular beam 21). This arrangement also provides an integrated multiple-box-like crush cone at location A on each end of the energy absorber 22. The crush cones of locations A are generally aligned with the vehicle frame rails, and reduce and manage loads into the vehicle frame during a rear impacts. The crush cone of area A include perpendicular parallel walls forming square tube sections 155–158 (i.e. "boxes within boxes"), each successive tube section being interconnected to the next with front or rear walls 159.

The illustrated energy absorber 22 (FIG. 1) is made of a structural engineering plastic, such as an ABS/PC blend (e.g. Xenoy™ made by General Electric Co) or PC/PBT blends. Because of a strength of these materials, the energy absorber 22 can include integrally formed accessory supporting structures, such as a housing 160 for supporting an electrical connector 161 adapted for connection to a trailer electrical connector plug, and/or a fascia-supporting brace 162 adapted for connection by a fastener to a lower flange of the rear end fascia to support the fascia on the vehicle, and/or wire harness retainers. The material of energy absorber 22 also allows other features to be integrated into the energy absorber 22, such as a license plate support area including apertured bosses for receiving screws to secure the license plate to the bumper system, light housings for supporting license plate illuminating lights, cornering lighting, exterior vehicle lighting, and the like.

The bumper system 20 (FIGS. 3–4) includes a hitch and ball support arrangement 125 described as follows. A hitch-supporting bracket 126 includes a U-shaped section 127 that faces downwardly and engages the middle section 102 of the beam 21. A first leg 128 extends outwardly from a bottom edge of the outer side flange of the U-shaped section 127 at a height about equal to the bottom wall 106 of the beam 21. A second leg 129 extends downwardly from a bottom edge of the inner side flange of the U-shaped section 127, and optionally includes a perpendicular horizontal lip 130 at its lower end. A support bracket 131 includes a pair of spaced-apart triangularly shaped side walls 133 welded in place with welds 134 with a wide end under the bottom wall 106 of the beam 21 and that rest on the lip 130. The support bracket 131 also optionally includes a horizontal flange 132 that connects sidewalls 133 and that abuts and supports an underside of the first leg 128 and/or abuts the leg 129 of the bracket 126. The support bracket 131 may also include holes AA, which are appropriately sized for accepting safety chain hooks, with the support brackets 131 providing sufficient support to meet safety chain loading requirements.

Figure 3:
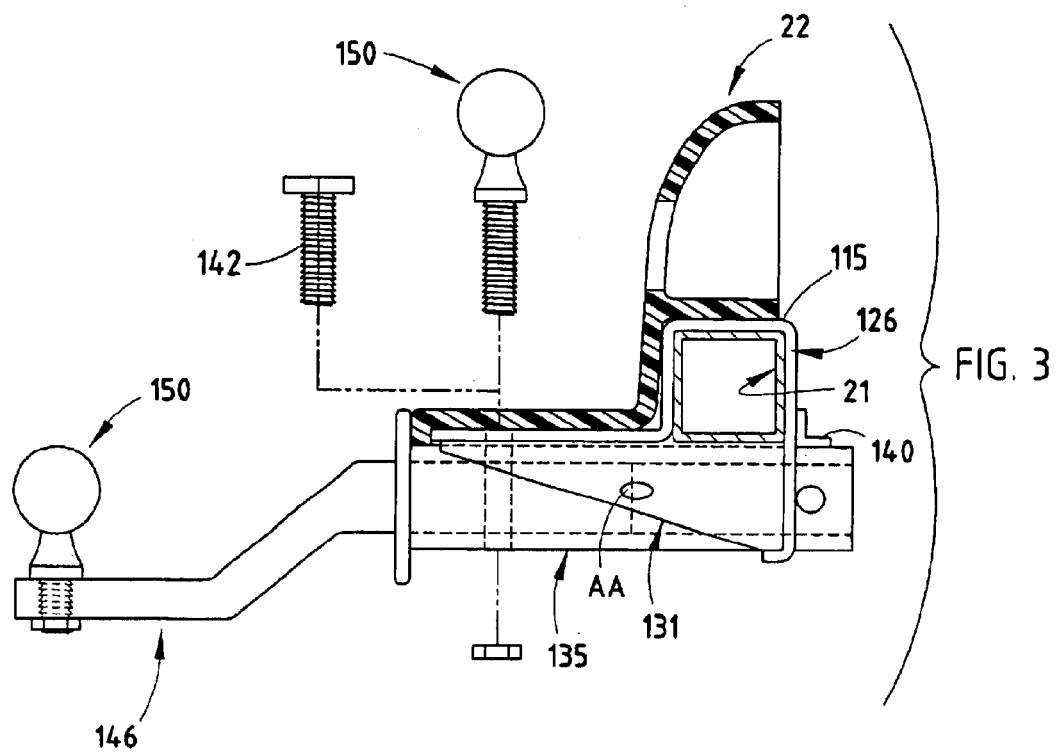
FIG. 3 is a cross section taken along the line III—III in FIG. 1.
Figure 4:
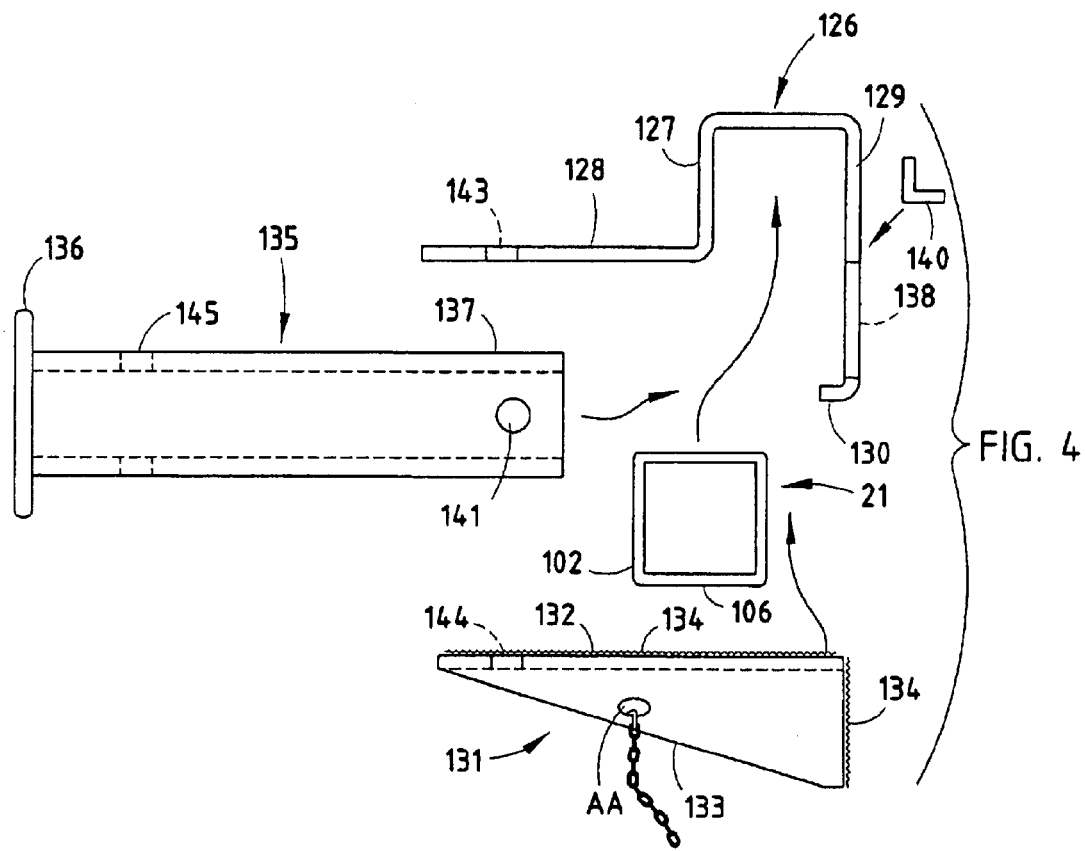
FIG. 4 is an exploded view of FIG. 3.

As illustrated in FIGS. 3–4, a hitch support tube 135 extends horizontally under leg 128 of the support bracket 126. An outer end of the hitch support tube 135 includes a radial face flange 136 for providing a blunt end on the support tube 135. An inner end 137 of the hitch support tube 135 extends through an aperture 138 on the downwardly extending second leg 129, with a top of the hitch tube 135 engaging the bottom wall 106 of the beam 21, and with a bottom of the hitch tube 135 engaging and resting on the lip 130. An L-shaped retainer 140 is welded or bolted to the inner end 137 of the hitch support tube 135 and/or a retainer bolt is extended through a hole 141 in the inner end 137 to positively and securely retain the hitch tube 135 to the beam 21 and prevent the hitch support tube 135 from being pulled out of the vehicle. On the outer end, a bolt 142 extends vertically through aligned holes 143 and 145 in the first leg 128 and the hitch support tube 135, respectively, and a nut is threaded onto the bolt 142. The aligned holes 143–145 can also receive a ball hitch 150 directly in place of the bolt 142, if desired, such that the ball hitch is located "on" the step of the vehicle. By this arrangement, the ball hitch 150 can be mounted directly on the leg 128 and used for class III towing. For example, see FIGS. 5–6, where the hitch tube 135 is eliminated, and the ball hitch 150 is supported on the leg 128.

In the arrangement of FIGS. 3–4, a hitch bar 146 includes an end that fits matingly into the hitch support tube 135, and a second end that extends horizontally outward from the vehicle and that drops downwardly a short distance. The hitch bar 146 includes a first hole that aligns with holes 143–145 for receiving the bolt 142 to retain the hitch bar 146 to the hitch support tube 135. The hitch bar includes a second hole 147 for receiving the threaded stud 148 of a ball hitch 149. This positions the ball hitch 149 rearward of the step of the bumper system 20 and also slightly lower, which is desirable in many towing situations.

Figure 5:
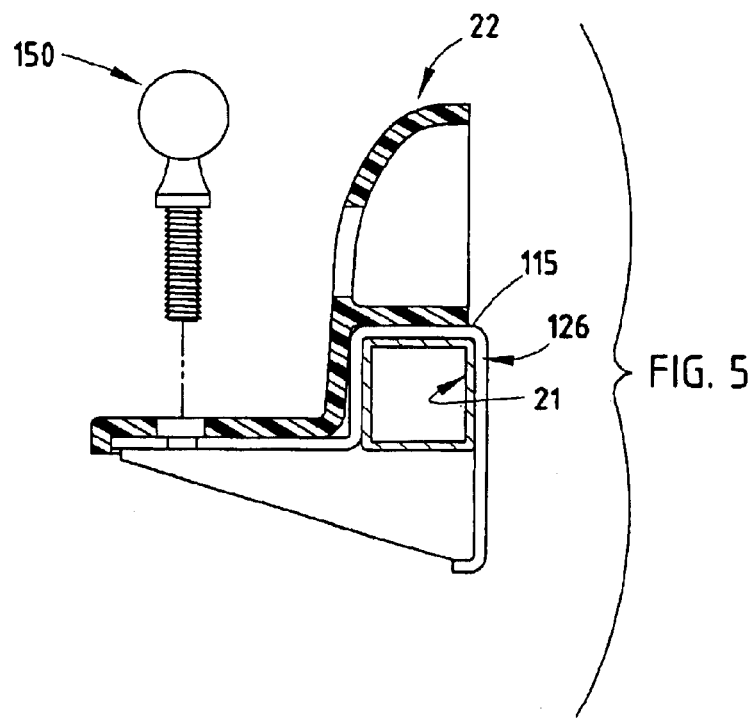
FIG. 5 is a cross section similar to FIG. 3 but of a modified bumper system.
Figure 6:
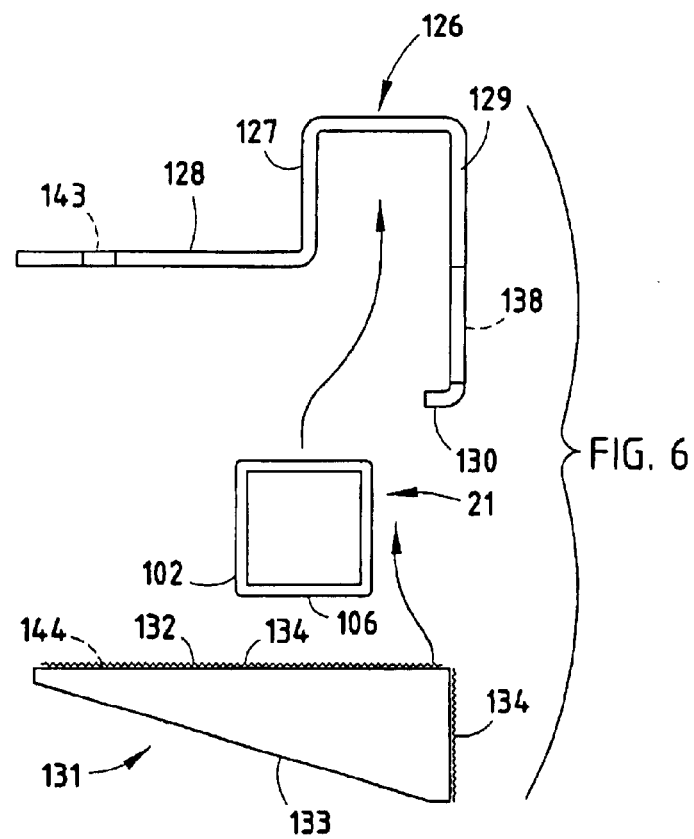
FIG. 6 is an exploded view of FIG. 5.

An important point of novelty of the present arrangement is that a hitch bar (146) is not required. Class III and higher towing is possible off of the step bumper itself, as shown in FIGS. 5–6.

Thus, the disclosed arrangements provide substantial torsional and tensile strength, such that they can be used for Class III towing without the use of additional add-on components and brackets. In particular, a step bumper arrangement is provided where a hitch tube is not required. (See FIGS. 5–6.) Specifically, testing has shown that the present arrangements are suitable for class III towing, which requires support of a tongue weight of 500 lbs, and support of a towing weight of 5,000 lbs. Notably, this is a higher class than many previous step-bumper designs, which were class II and which supported tongue weights limited to 350 lbs. and which supported towing weights limited to only 3500 lbs.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system comprising:
    a tubular bumper beam;
    a hitch-supporting bracket having an inverted section shaped to fit downwardly onto the tubular bumper beam, and further having a laterally-extending second section; and
    a hitch support tube secured to the laterally-extending second section and having a hole therein, the second section being shaped to support a ball hitch for hauling a trailer.

2. The bumper system defined in claim 1, wherein the inverted section is U-shaped and shaped to straddle the bumper beam.

3. The bumper system defined in claim 2, wherein the second section includes a panel that extends horizontally when in a vehicle-mounted position.

4. The bumper system defined in claim 3, wherein the inverted section includes a long leg that extends downwardly below a height of the panel, and further the hitch support tube is fixedly supported under the panel.

5. The bumper system defined in claim 4, wherein the long leg includes a lip at its lower free end, and wherein the hitch support tube includes an end resting on the lip.

6. The bumper system defined in claim 5, wherein the end of the hitch support tube extends through an aperture in the long leg, and including a retainer that extends through the end on a back side of the long leg for retaining the hitch support tube to the bracket despite substantial towing forces acting on the hitch support tube.

7. The bumper system defined in claim 6, wherein the panel and the hitch support tube include aligned, holes shaped to receive a stem of a ball hitch.

8. The bumper system defined in claim 6, including a support bracket positioned under the hitch-supporting bracket and engaging the long leg and the panel, the support bracket being shaped to support the panel in a horizontal orientation relative to the hitch-supporting bracket and including holes shaped to provide an attachment point of sufficient strength to engage and support a safety chain.

9. The bumper system defined in claim 1, including an energy absorber that substantially covers the beam and hitch-supporting bracket, and that extends outboard of ends of the beam.

10. The bumper system defined in claim 1, wherein the bumper beam that includes a center section, end sections, and bent interconnecting sections that interconnect each end section with an end of the center section, the center section being at least 25% of a length of the bumper beam and defining a longitudinal primary centerline, and the end sections being at least 15% of the length and each defining a secondary centerline that extends parallel the primary centerline.

11. The bumper system defined in claim 1, including an energy absorber positioned on a face of the bumper beam, with at least a portion of the hitch-supporting bracket being located under a center of the energy absorber.

12. The bumper system defined in claim 1, wherein the energy absorber includes end sections that extend outboard of ends of the beam, the end sections having a flat top surface and being structural such that the end sections form steps located outboard of the ends of the beam.

13. The bumper system defined in claim 1, wherein the tubular bumper beam includes a center section, end sections, and bent interconnecting sections that interconnect each end section with an end of the center section, the center section being at least 25% of a length of the bumper beam and defining a longitudinal primary centerline, and the end sections being at least 15% of the length and each defining a secondary centerline that extends parallel the primary centerline; and including an energy absorber with at least one rear recess shaped to receive a portion of the tubular bumper beam; and mounts on the tubular bumper beam adapted for attachment to a vehicle and that are attached to the end sections, the secondary centerline being spaced horizontally from the primary centerline when in a vehicle-mounted position.

14. The bumper system defined in claim 13, wherein the center section is located partially between the mounts and farther from the passenger compartment than the end sections.

15. The bumper system defined in claim 1, wherein the beam has a face and has mounts adapted for mounting to a vehicle frame; and an energy absorber engaging the face and having end sections located outboard of ends of the beam, the energy absorber being made of a structural engineering polymeric material and the end sections having flat top surfaces for forming steps outboard of the ends of the beam.

16. The bumper system defined in claim 1, wherein the beam has a face and has mounting structures adapted for mounting to a vehicle frame; and an energy absorber engaging the face and made of a structural engineering polymeric material, the energy absorber including a honeycomb structure for absorbing energy upon a vehicle impact, and further including accessory-mounting structures for mounting and supporting accessories on the energy absorber.

17. The bumper system defined in claim 16, wherein the accessory-mounting structures include an integrally-formed molded-in structure shaped and adapted to house and retain an electrical accessory.

18. The bumper system defined in claim 17, including an electrical connector attached to the molded-in structure.

19. The bumper system defined in claim 18, including a bracket attached to and supported by the beam and forming a step.

20. The bumper system defined in claim 16, wherein the energy absorber includes end sections that extend outboard of ends of the beam, the end sections having a flat top surface and being structural such that the end sections form steps located outboard of the ends of the beam.

21. The bumper system defined in claim 1, wherein the beam has a face and has opposing end sections adapted for attachment to mounts on a vehicle frame to support the bumper system; and an energy absorber made of a structural engineering polymeric material for absorbing impact forces against the beam during a collision, the energy absorber including corner-forming sections extending outwardly from the end sections of the beam in cantilever, the corner-forming sections including top surfaces forming steps at opposite corners of the vehicle for supporting a person while being stepped upon by the person.

22. The bumper system defined in claim 21, wherein the top surfaces of the corner-forming sections are relatively flat and define a horizontal plane.

\* \* \* \* \*